United States Patent [19]

Tsuboi et al.

[11] 3,940,669

[45] Feb. 24, 1976

[54] AC MOTOR CONTROL SYSTEM

[75] Inventors: Takashi Tsuboi; Tokunosuke Tanamachi, both of Katsuta, Japan

[73] Assignee: Hitachi, Ltd., Japan

[22] Filed: Nov. 22, 1974

[21] Appl. No.: 526,405

[30]    Foreign Application Priority Data
   Dec. 7, 1973    Japan............................ 48-136041

[52] U.S. Cl................. 318/227; 318/230; 321/45 C
[51] Int. Cl.²............................................ H02P 5/40
[58] Field of Search.......... 318/138, 254, 227, 230, 318/231; 321/45 C, 12

[56]    References Cited
   UNITED STATES PATENTS

| | | | |
|---|---|---|---|
| 3,321,697 | 5/1967 | Etter | 321/45 C |
| 3,569,819 | 3/1971 | Martzloff et al. | 321/12 |
| 3,675,099 | 7/1972 | Johnston | 318/227 X |

*Primary Examiner*—G. Z. Rubinson
*Attorney, Agent, or Firm*—Craig & Antonelli

[57]    ABSTRACT

A control system for an A.C. motor which is connected to the output terminals of a thyristor inverter, a capacitor is connected between the D.C. input terminals of the thyristor inverter, and the respective thyristors constituting the inverter are extinguished by self commutation due to an oscillating current produced by the capacitance of the capacitor and the reactance component of the armature coils of the A.C. motor connected to the A.C. output terminals of the thyristor inverter, and a current in the waveform of pulses produced by electric oscillation is delivered in a predetermined phase sequence to the armature coils of the A.C. motor.

7 Claims, 9 Drawing Figures

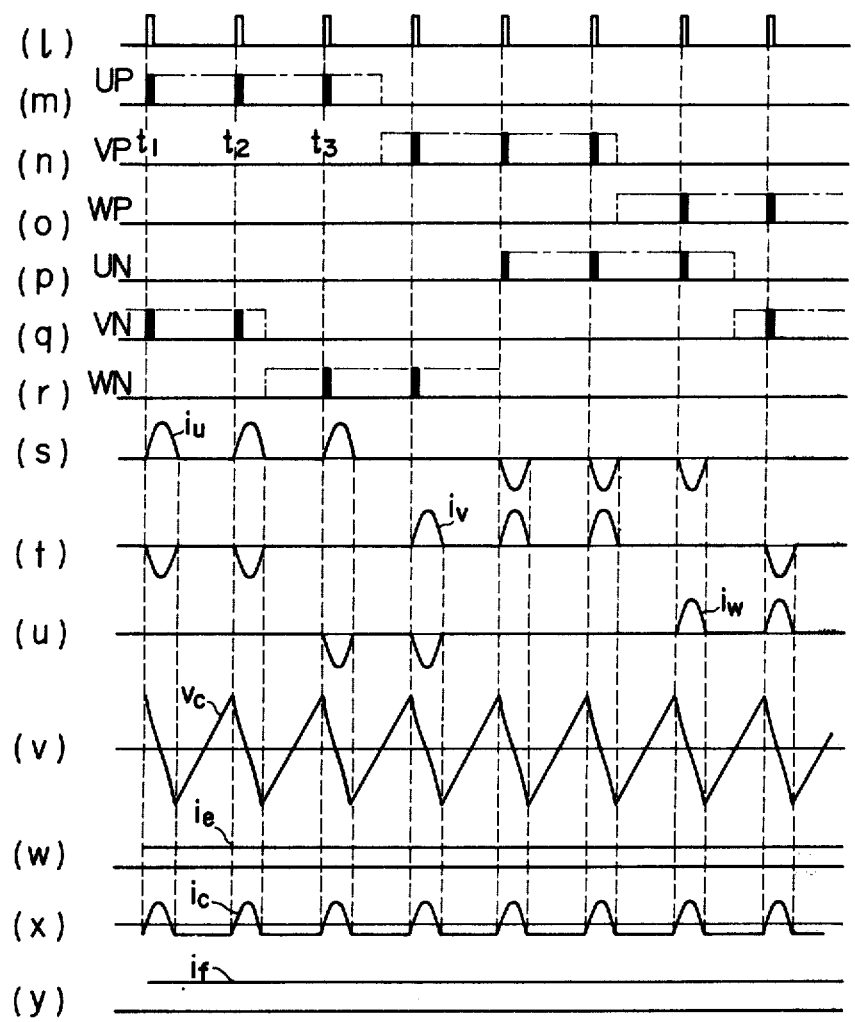

AC MOTOR CONTROL SYSTEM

BACKGROUND OF THE INVENTION

The present invention relates to an A.C. motor control system and, more particularly, a control system to permit a variable speed operation of an A.C. motor by converting D.C. power into an A.C. voltage with variable frequency through a thyristor inverter.

It is common to provide individual commutating means for each of the thyristors constituting an inverter for operating an A.C. motor at a variable running speed. Since such a system having individual commutating means for the respective thyristors allows the thyristors to be individually turned on or off at a desired time, motor control may be effectively done with a large degree of freedom. Further, the A.C. motor may be operated with a voltage waveform desirable for itself. However, this system is not suitable for the variable speed operation for a small A.C. motor, such as a small asynchronous motor, whose operation efficiency or torque pulsation is not a serious problem in the point that the construction of the system is excessively large.

In this respect, another system to overcome above disadvantages has been proposed in which a single commutating means is provided for the respective thyristors of the inverter to simplify the structure of the system.

Japanese Patent Publication No. 24447/67, for example, discloses such a system in which a commutating means composed of a reactor and a capacitor is provided. In the system, when turning off the thyristors which are conductive then, an oscillating current generating circuit including the reactor and the capacitor is formed to generate a high frequency A.C. signal to invert, during a relatively short time, the current flowing through the conducting thyristors, to turn them off.

Therefore, the reactor is essential to this system and thus the system structure thereof is also large.

SUMMARY OF THE INVENTION

Accordingly, an object of the present invention is to provide a variable speed control system for an A.C. motor with a simple structure.

According to one aspect of the present invention, there is provided an A.C. motor drive system comprising a thyristor inverter taking D.C. power from a D.C. power source and producing A.C. power; an A.C. motor connected to the output terminals of the inverter; a capacitor connected across the input terminals of the inverter and whose capacitance is capable of resonating with the reactance of the armature coils of the A.C. motor; and a gate signal generating means repeatedly providing in a predetermined sequence a gate signal for each of the gate electrodes of a plurality of thyristors constituting the inverter, wherein pulsating current is applied to the motor.

The above and other objects and features will be apparent from the following description taken in connection with the accompanying drawings.

BRIEF DESCRIPTION OF THE DRAWING

FIG. 9 shows waveforms to aid in explaining the operation of the embodiment of FIG. 8.

DETAILED DESCRIPTION OF THE PREFERRED EMBODIMENT

Figure 1:
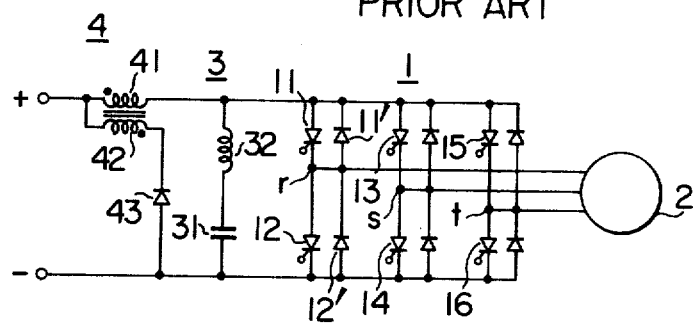
FIG. 1 is a circuit diagram of an example of a conventional A.C. motor control system.

Before describing the present invention, the circuit diagram of a known circuit disclosed in the above-mentioned Japanese Patent Publication No. 24447/67 will first be referred to, for ready understanding of the present invention. FIG. 1 shows a circuit diagram of the essential part of the control system disclosed in the Japanese Patent Publication No. 24447/67, in which a thyristor inverter is generally indicated by reference numeral load each unit thereof is comprised of two couples of thyristors and diodes, for example a couple of thyristor 11 and diode 11' and another couple of thyristor 12 and diode 12' in the r phase unit of the inverter, in each couple the thyristor and the diode being connected in opposite parallel relation. Reference numeral 2 designates an A.C. motor and, 3 means for turning off the thyristors consisting of a capacitor 31 and a reactor 32. A means 4 for restricting a current of the thyristors and a voltage across the capacitor 31 is comprised of a transformer having windings 41 and 42, and a diode 43.

Since a detail description of the operation of the conventional system of FIG. 1 has been made in the above-mentioned Japanese Patent Publication No. 24447/67, the operation thereof will be briefly described hereinafter. In the system disclosed assume now that, for example, a load current flows through the thyristor 11. By turning on the mate thyristor 12 and thereby forming an oscillation circuit composed of the capacitor 31, the reactor 32, and the thyristors 11 and 12, the thyristors 11 and 12 are then turned off.

Figure 2:
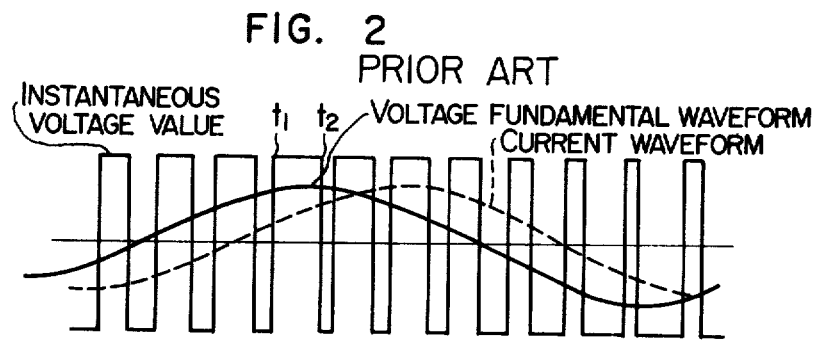
FIG. 2 shows waveforms to aid in explaining the operation of the A.C. motor control system of FIG. 1.

The voltage across the load terminal, for example the voltage of the r phase, obtained in the conventional system of FIG. 1 appears in the form of a pulse train, as shown in FIG. 2. The armature current of the motor, however, may continuously flow as shown in the dotted line in FIG. 2 due to the function of the parallel diodes, for example 11' and 12'. Although the continuity of the motor current flowing may be secured in the conventional motor control system of FIG. 1, the conventional system requires additional diodes as well as the indispensable reactor 32.

Therefore, this system has still a problem of large structure.

Figure 3:
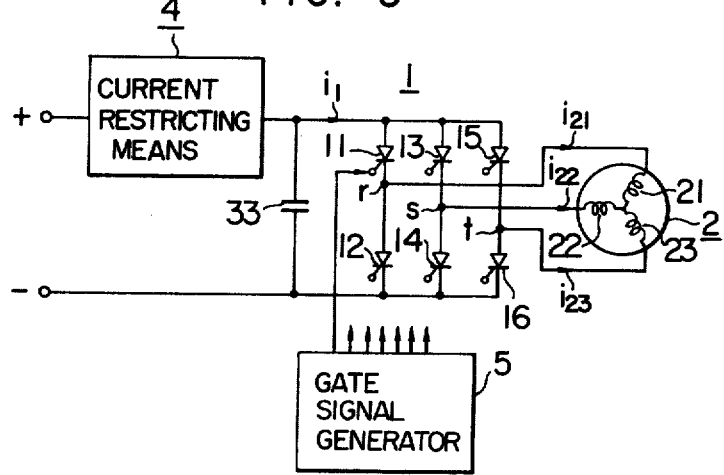
FIG. 3 is a circuit diagram of an embodiment of an A.C. motor control system according to the present invention.

FIG. 3 shows a circuit construction of an embodiment of the present invention, in which 1 designates generally an inverter composed of thyristors 11 to 16, 2 an induction motor, 21 to 23 the armature windings of the motor, 33 a capacitor, 4 current restricting means including resistor means and reactor means, and 5 a gate signal generator to provide gate signals for the respective thyristors 11 to 16.

Figure 4:
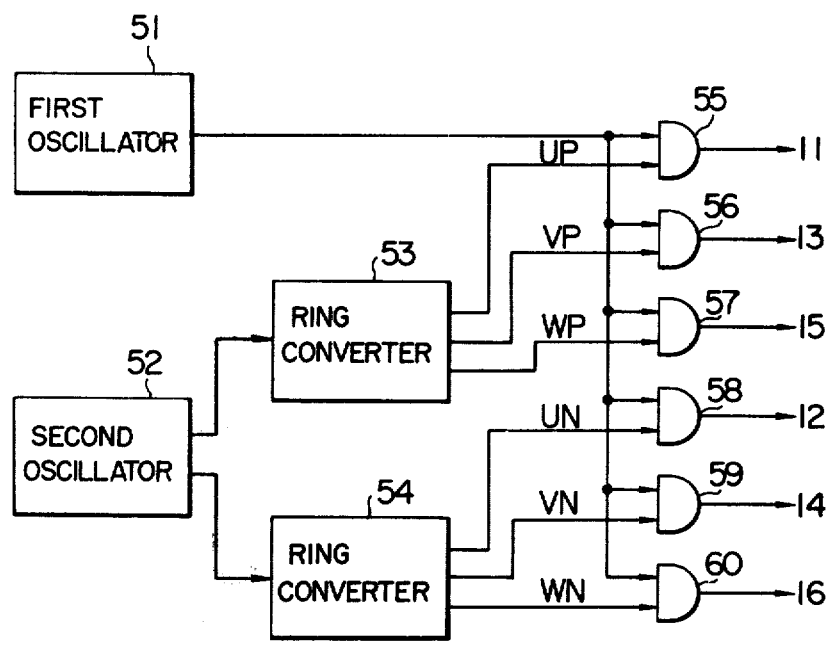
FIG. 4 is a block diagram of a gate signal generator.

FIG. 4 is a schematic block diagram of the gate signal generator 5, in which 51 designates a first oscillator for producing pulse frequency, 52 a second oscillator for providing the output frequency of the thyristor inverter 1, 53 and 54 ring converters, and 55 to 60 AND gates.

Figure 5:
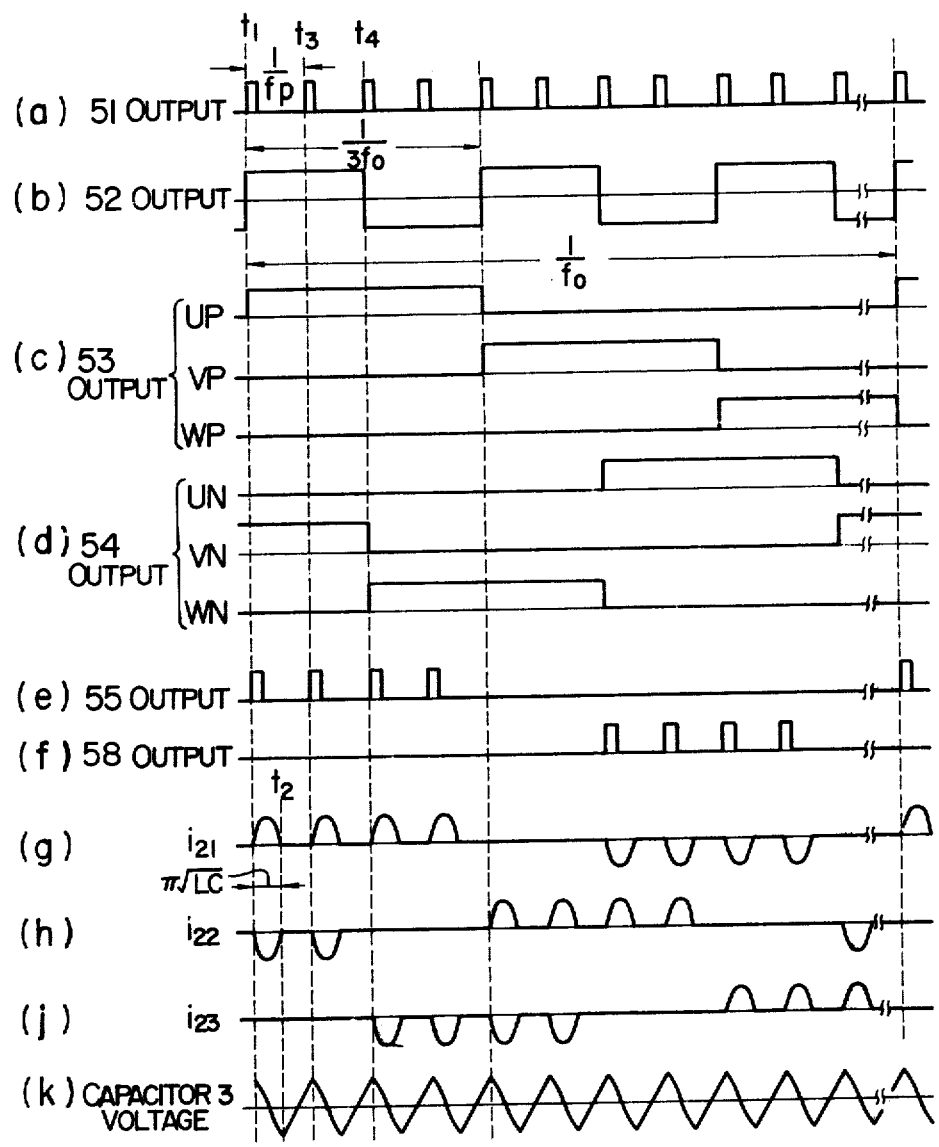
FIG. 5 shows waveforms to aid in explaining the operation of the system of FIG. 3.

FIG. 5 shows waveforms for explaining the operation of the embodiment of the present invention of FIGS. 3 and 4. The first oscillator 51 generates pulse signals having a repetition rate of $f_p$, as shown as a waveform (a) in FIG. 5. The frequency $f_p$ may be variable. Such a pulse generator may be easily realized by utilizing a well known oscillation circuit using unijunction transistors.

The second oscillator 52 generates an A.C. output signal having a frequency of $3f_o$, as shown as a waveform (b) in FIG. 5. This frequency $3f_o$ may also be adjustable. A known magnetic multi-oscillator may be used for the oscillator generating such an A.C. output signal.

The positive half-wave of the second oscillator output is frequence-demultiplied into three signals UP, VP, WP, as shown as waveforms (c) in FIG. 5, through the ring counter 53 which per se is known, while the negative half-wave thereof is also frequency-demultiplied into signals UN, VN, and WN, as shown as waveforms (d) in FIG. 5, through the known ring counter 54. The respective outputs of the ring counter and the pulse signals are AND-gated so as to produce gate signals for the respective thyristors, as shown as waveforms (a) and (b) in FIG. 5. That is, the ring counters 53 and 54 serve to distribute the pulse signals generated by the first oscillator 51 to the respective thyristor arms of the inverter 1. In this respect, the frequency $f_o$ of the output of the ring counter is called the distributing frequency. In this manner, the AND gates 55 to 60 generate trigger signals for the respective thyristors 11 to 16, which trigger signals amplified to be separately supplied to the respective thyristors. For example, when a gate current is fed at time $t_1$ to the respective gates of the thyristors 11 and 14, the charges stored in the capacitor 33 are discharged through the path of thyristor 11, winding 21, winding 22, and thyristor 14 in turn. At this time, the capacitance C of the capacitor 33 and the inductance L of the armature windings 21 and 22 produce a sinusoidal half-wave current whose width is $\pi$ LC as shown as waveforms (g) and (h) in FIG. 5. During the period of time of the half-wave width, the voltage across the capacitor 33 is inverted from positive polarity to negative polarity and then, after the current has reached zero at the time $t_2$, the inverse voltage is applied to the thyristors 11 and 14 so that the respective thyristors are turned off. The thyristors 11 and 14 are again turned on at time $t_3$ and then the sinusoidal half-wave flows through the armature windings 21 and 22. At time $t_4$, the output of the AND gate 60 causes the thyristor 16, instead of the thyristor 14, to be turned on and thus the current flowing into the armature winding 21, flows through and out of the armature winding 23. If the thyristors 11 to 16 are repeatedly turned on by applying the distributing signals shown as waveforms (c) and (d) in FIG. 5, the pulse current, shows as waveforms (g), (h), and (j) in FIG. 5, may be permitted to flow through the armature windings 21 to 23, resulting in rotation of the motor 2. The experiment conducted by the inventors shows the fact that the torque characteristic when such pulse current flows through the armature windings resembles the torque characteristic when a sinusoidal current having equal waveform to the fundamental wave of the pulse train flows therethrough. The width of the pulse current is determined after general consideration of the turn-off time of the respective thyristors, the inductance of the armature windings, the armature current of the motor, etc. When a common induction motor is employed, the pulse current width is 0.5 to 1 ms and is enough to provide a rated current. In this case, an economical universal type thyristor may be used and there is no need of the use of a high speed type thyristor with a short turn-off time.

In this embodiment, the pulse frequency $f_p$ is 12 times the distributing frequency $f_o$. However, the relationship between these frequencies is not limited to such one, but it may be changed desirably. When the relationship between the frequencies $f_p$ and $f_o$ is given by $$f_p = 6Nf_o \ (N = 1, 2, \ldots) \qquad (1)$$

the respective phase currents $i_{21}$, $i_{22}$, and $i_{23}$ are completely symmetrical waves so that the balanced multiphase currents flow into the motor thereby to effectively develope torque. When the relationship given by the equation (1) is not held, the phase currents are unbalanced so that the torque is to be slightly reduced. If the motor running under an acceleration mode experiances such an unbalanced condition, there occurs substantially no problem in practical application. The speed control of the motor may be made by controlling the respective frequencies of the first oscillator 51 and the second oscillator 52. Upon the change of the frequency $f_p$ of the first oscillator 51, the pulse density of the pulse train changes so that the fundamental wave of the current given to the motor changes in amplitude. The result is that the torque and the speed are changed according to the torque-speed characteristic of the motor.

The change of the frequency $f_o$ of the second oscillator 52 brings about the change of the distributing frequency, or the frequency of the output of the inverter. The control of the frequency $f_o$ is suitable especially for the speed control of the induction motor. It is, of course, possible to simultaneously change both the frequencies $f_p$ and $f_o$.

Figure 6:
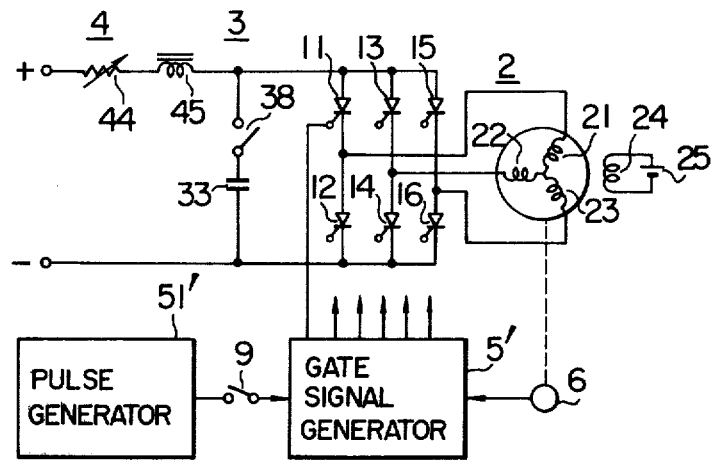
FIG. 6 is a circuit diagram of another embodiment of the A.C. motor control system according to the present invention.

The present invention is applicable not only to the induction motor but also to the synchronous motor. FIG. 6 shows an embodiment when the present invention is applied to a synchronous motor 2, in which 24 designates an exciting winding of the synchronous motor 2, 25 an exciting power source, 6 position detector or means for detecting the rotational position of the motor 2, 4 a current restricting means consisting of a variable resistor 44 and a reactor 45, 9 and 38 switch means, 51' a pulse generator similar 51 shown in FIG. 4, 5' a gate signal generator, and the remainder of the reference numerals refer to like parts in FIG. 3. The position detector 6 acts as to detect a magnetic relative position between the armature windings 21 to 23 and the field system 24, and acts so as to constantly synchronize the output of the electric motor 2 with that of the inverter 1. That is, the position detector 6 generates distributing signals corresponding to the output signals UP to WN of the ring counters 53 and 54 shown in FIG. 4. Such construction enables the synchronous motor to be always controlled in a stable manner keeping synchronization. The operation of this system will be described hereinafter in detail.

The position detector 6 is not essential when operating the synchronous motor. The synchronous motor may be operated through the frequency control of the second oscillator, as shown in FIG. 4 by way of example, when it is operated at a constant speed or when the speed-torque characteristic of the load is fixed and the speed to frequency pattern in which "step out" is prevented, may be predetermined.

The connection of the thyristor inverter 1 is not limited to the connection shown, but may be modified without departing from the spirit of the present invention to the effect that the thyristors of the inverter are turned off by self commutation due to electrical oscillation produced by the inductance of the armature windings of the motor and the capacitor connected across the input terminals of the inverter.

Many attempts have been made to realize a commutatorless synchronous machine which is fed from a D.C. power source through a thyristor inverter whose thyristors are gated in accordance with a predetermined sequence depending on the magentic relative position between the armature windings and the field system. However, such a technique or feature of the present invention as described above has not been known yet. The thyristor control commutatorless motor has had a problem in starting. More specifically, when the synchronous machine revolves in a normal state, the induced voltage in the armature windings enables the commutation of the thyristors of the inverter. However, when the synchronous machine is not in operation, no voltage is induced in the armature windings, thereby failing to commutate the thyristors. Thus, the starting of the motor is impossible.

For this reason, the conventional commutaterless synchronous machine must be provided with forced commutating means including a reactor, a capacitor, a thyristor, etc. at the D.C. input side of the thyristor inverter. On the other hand, as aforementioned in connection with the preferable embodiment according to the present invention referring to FIGS. 3 to 5, a capacitor is connected across the D.C. input terminals of the thyristor inverter, so that the capacitance of the capacitor and the inductance of the armature windings constitute an electric oscillating circuit which causes a pulse current fo flow through the armature windings.

That is, the present invention requires no such large and heavy enforced commutating means described above, but the simplest commutating means consisting of only a capacitor. Further, with such simple commutating means, the present invention not only has solved the problem involved in the starting of the conventional commutatorless synchronous machine but also enables the speed control of the commutatorless synchronous machine when the machine runs under a normal condition. The application of the present invention to the commutatorless synchronous motor will be described later in detail. At first, an example of the conventional commutatorless motor control system will be given.

Figure 7:
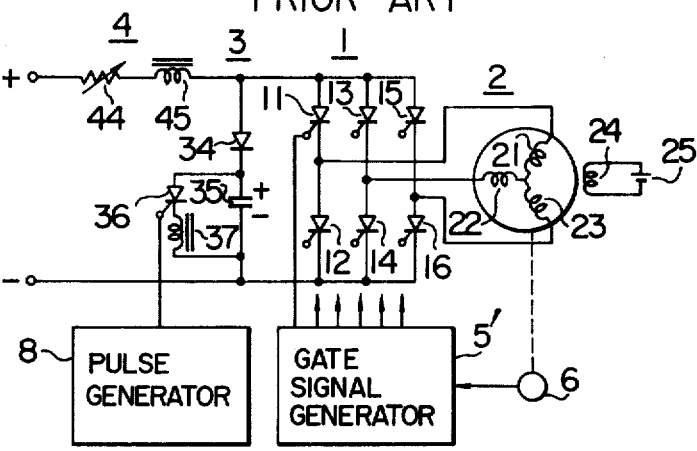
FIG. 7 is a circuit diagram of an example of a prior art commutatorless motor.

Referring now to FIG. 7, there is shown a circuit diagram of a system for controlling the starting of the synchronous motor with A.C. power which is converted from D.C. power through a thyristor inverter. In the drawing, like reference numerals refer to like parts in FIGS. 1 through 6. In FIG. 7, 44 is a starting resistor, 45 a reactor, and 3 a enforced commutating means consisting of a thyristor 36, a reactor 37, a capacitor 35 and a diode 34. Further, 1 designates an inverter composed of thyristors 11 to 15, 2 a synchronous machine, 5' a gate signal generator for controlling the thyristors 11 to 16 in response to a signal from a position detector 6, and 8 a pulse generator which generates a starting signal.

In this circuit construction, it is well known how to gate these thyristors 11 to 16 of the inverter 1, and therefore a detail description thereof will be emitted. At the starting of the machine, the thyristors 11 to 16 are commutated by the enforced commutating means 3. This will be briefly described. Assuming that the capacitor 35 is charged with the polarity as shown in the figure, when the thyristor 36 is turned on by the start signal generator 8, the charge stored in the capacitor discharges oscillatorily through the reactor 37, and then the capacitor 35 is charged with the polarity opposite to that shown in the drawing. Accordingly, an inverse voltage is applied to the thyristors 11 to 16 of the inverter 1 thereby to turn off the thyristors.

The thyristors 11 to 16 are thus commutated, and if the capacitor 35 stores a sufficient amount of charge, the commutating operation may be done at any time.

However, this enforced commutating means requires many components and is thus expensive. Further, since a heavy component such as the reactor 37 is used, it is unsuitable when it is applied especially to an electric car.

Reference is now made to FIG. 6 again together with FIG. 2 illustrating waveforms, for explaining the application of the present invention to the commutatorless motor control.

For starting the motor 2, the switches 38 and 9 are closed to actuate the pulse signal generator 51' for generating a pulse output with a predetermined interval as shown as a waveform ($l$) in FIG. 9. On the other hand, the position detector 6 delivers signals as depicted with a chained line in FIG. 9 as waveforms ($m$) to ($r$) or distributing signals UP to WN to be applied to the gate signal generator 5'. The gate signal generator 5', the output pulse of the pulse signal generator 51' and the distributing signals UP to WN from the position signal detector 6 are AND-gated to produce pulses as shown in the waveforms ($m$) to ($r$) in FIG. 9 as thick black pulses which are applied in turn to the respective thyristors 11 to 16. More in particular, the distributing signal from the position detector 6 permits the output pulses generated by the pulse generator 51' to 90 to the gate of gates thyristors 11 to 16 in the order which is decided by the position detector 6.

The gate signal generator 5' delivers at time $t$, the gate pulses to the thyristors 11 and 14 thereby to turn them on. Upon conduction of the thyristors 11 and 14, a close circuit of the capacitor 33, the thyristor 11, the armature winding 21, the armature winding 22, the thyristor 14, and the capacitor 33, is formed. This closed circuit is an oscillating circuit composed of the capacitance of the capacitor 33 and the inductance of the armature windings 21 and 22. When this closed circuit is formed, the charge stored in the capacitor 33 discharges to provide currents $i_u$ and $i_v$ as shown as waveforms ($s$) and ($t$) in FIG. 9 for the armature windings 21 and 22. At this time, the terminal voltage $V_c$ across the capacitor 33 reduces, as shown as a waveform ($v$) in FIG. 9. After a time elapses, the discharge currents of the capacitor 33, i.e. the currents $i_u$ and $i_v$, tend to invert the respective polarities thereof. On the other hand, the terminal voltage $V_c$ across the capacitor 33, at this time, has a polarity opposite to that shown in the drawing. Therefore, an inverse voltage is applied to the thyristors 11 and 14 thereby to turn them off, with the result that the currents $i_u$ and $i_v$ come to zero. When the thyristors 11 and 14 are turned off, the capacitor 33 is charged by a substantially constant current $i_v$ by the action of the reactor 45 as shown as a waveform (w) is FIG. 9, so that the terminal voltage $V_c$ thereof increases as shown as the waveform (v) in FIG. 9. At time $t_2$, the thyristors 11 and 14 conduct again to permit the currents $i_u$ and $i_v$ to flow through the armature windings 21 and 22.

At this time, a current $i_f$ with a waveform (y) as shown in FIG. 9 is delivered from the excitating means 25 to the field system 24 of the motor 2.

Consequently, the flux developed by the field system 24 interacts with the currents flowing through the armature windings 21 and 22 to produce electromagnetic force to rotate the rotor of the motor 2.

When the rotor rotates by a certain angle, the position detector 6 applies the distributing signal WN with the waveform (r) as shown by a chained line in FIG. 9 to the gate signal generator 5'. Thus, at time $t_3$, the thyristors 11 and 16 are turned on to allow the respective currents $i_u$ and $i_v$ with the waveforms (s) and (u) as shown in FIG. 9 to flow through the armature windings 21 and 23. Commutation from the thyristor 14 to the thyristor 16 are ensured since no current flows through the armature windings 21, 22, and 23 when the gate signal generator 5' applies the gate pulses to the respective thyristors 11 and 16.

A similar process will subsequently continue to make the thyristors 11 to 16 turn on in turn in a predetermined sequence. The result is that the respective currents $i_u$, $i_v$, and $i_w$ with the waveforms (s), (t) and (u), as shown in FIG. 9, flow through the armature windings 21, 22, and 23 of the motor 2 so as to rotate the motor continuously.

When the thus started motor is accelerated to some extent, each of the voltages produced in the armature windings 21, 22, and 23 becomes a sufficient value to permit the commutation operation of the inverter 1.

When the counter electromotive force of the motor 2 is thus established, the speed control of the motor may be continued or the switches 38 and 19 may be cut off. Upon the cutting off the switch 9, the gate signal generator 5' controls the conductions of the thyristors 11 to 16 in accordance with the distributing signals of the position detector 6.

The starting resistor 44 restricts the overcurrents from the D.C. power source at the starting of the motor, and is adjusted so as to gradually decrease in resistance, as the counter electromotive force grows to be established. When the counter electromotive force is established, the starting resistor is short-circuited.

The starting operation of the commutatorless motor control system according to the present invention is as in the above-described manner. As described above, in the present invention, the commutation of the thyristor inverter is carried out by providing an oscillating circuit composed by the capacitor connected between the D.C. input terminals of the thyristor inverter and the armature windings of the motor so as to allow pulse currents to flow through the armature windings. Accordingly, forced commutating means may be constructed by using only the capacitor 33 and without using the thyristor 36, the reactor 35, and the diodes 34 which are essential to the conventional system of FIG. 7. Accordingly, the motor control system according to the present invention is smaller in size and lower in cost, compared with the conventional one. Further, a heavy weight component such as the reactor 36 is unnecessary, so that the system according to the present invention may be made light.

Although the embodiment shown in FIG. 6 employs the starting signal generator 6 generating the output pulse with a fixed frequency, it is not necessary particularly to fix the frequency thereof, but the frequency may be variable in accordance with the speed of the motor 2.

The D.C. current with the waveform (w) as shown in FIG. 9 continues to flow through the reactor 45. For this, the capacitor 33 is charged when the thyristors 11 to 16 are not conductive. Therefore, when the pulse frequency of the pulse signal generator 51' is low, there is a possibility that the charging voltage of the capacitor 33 becomes excessively high.

Figure 8:
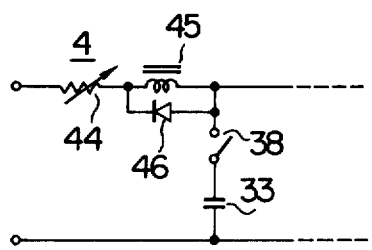
FIG. 8 shows a circuit of a part of still another embodiment of the present invention.

This, however, may be avoided, if the diode 46 is connected across the reactor 45, as shown in FIG. 8.

From the foregoing description, it is understood that, in the case of the commutatorless synchronous motor control system according to the present invention, merely connecting a capacitor across the D.C. input terminals of the thyristor inverter ensures the commutation of the thyristors, and thus the control system is economical in cost. Further, it does not require a heavy weight component such as the reactor. Therefore, the control system according to the present invention is suitable for electric cars, for example.

I claim:

1. An A.C. motor control system comprising:
   a thyristor inverter including a plurality of thyristors adapted to be fed from a D.C. power source to thereby produce A.C. power;
   an A.C. motor connected to the output terminals of said inverter;
   a capacitor connected between the input terminals of said inverter, said capacitor forming an electrical oscillation circuit in combination with the inductance of the armature windings of said A.C. motor to pass a sinusoidal half-wave current through said armature windings when the thyristors of said inverter are triggered; and
   gate signal generating means repeatedly supplying the respective electrodes of said plurality of thyristors constituting said inverter with gate signals in predetermined sequence, whereby said motor is supplied with pulse currents.

2. An A.C. motor control system according to claim 1, in which said gate signal generating means comprises:
   first signal generating means for generating a pulse train;
   second signal generating means for generating successively in predetermined sequence electrical signals corresponding to said respective thyristors;
   AND gate means for obtaining the logical product of the pulse train from said first signal generating means and the respective electric signals corresponding to said thyristors from said second signal generating means to thereby produce output signals to be supplied as gate signals to the respective gate electrodes of said corresponding thyristors.

3. An A.C. motor control system according to claim 2, in which the frequency of the output signal of at least one of said first signal generating means and said second signal generating means is variable.

4. An A.C. motor control system according to claim 2, in which said A.C. motor is a synchronous motor and said second signal generating means is means for detecting the rotational position of the armature of said motor.

5. An A.C. motor control system according to claim 3, in which said A.C. motor is a synchronous motor and said second signal generating means is means for detecting the rotational position of the armature of said motor.

6. An A.C. motor control system according to claim 4, in which said gate signal generating means includes switching means for rendering said first generating means ineffective in operation when said motor reaches a normal speed after starting so that said thyristors are controlled by only the output signals of said means for detecting the rotational position of the armature of said motor.

7. An A.C. motor control system according to claim 1, wherein said electrical oscillation circuit serves as a commutating means for said triggered thyristors of said inverter.

* * * * *